(12) United States Patent
Bonaccorsi et al.

(10) Patent No.: US 11,084,016 B2
(45) Date of Patent: Aug. 10, 2021

(54) POLYMERIZATION UNIT WITH IMPROVED MANHOLE

(71) Applicant: BASELL POLIOLEFINE ITALIA S.R.L., Milan (IT)

(72) Inventors: Gian Luca Bonaccorsi, Ferrara (IT); Giuseppe Penzo, Ferrara (IT); Enrico Balestra, Ferrara (IT); Maurizio Dorini, Ferrara (IT); Riccardo Rinaldi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 23 days.

(21) Appl. No.: 16/636,774

(22) PCT Filed: Jul. 17, 2018

(86) PCT No.: PCT/EP2018/069381
§ 371 (c)(1),
(2) Date: Feb. 5, 2020

(87) PCT Pub. No.: WO2019/029955
PCT Pub. Date: Feb. 14, 2019

(65) Prior Publication Data
US 2020/0376458 A1     Dec. 3, 2020

(30) Foreign Application Priority Data
Aug. 10, 2017   (EP) ..................... 17185700

(51) Int. Cl.
*B01J 19/06*     (2006.01)
*B01J 19/24*     (2006.01)

(52) U.S. Cl.
CPC ............... *B01J 19/06* (2013.01); *B01J 19/24* (2013.01)

(58) Field of Classification Search
CPC ..... B01J 19/06; B01J 19/24; B01J 3/03; B01J 19/00; C08F 2/00
USPC ........................................................ 422/122
See application file for complete search history.

(56) References Cited

FOREIGN PATENT DOCUMENTS

| CN | 2714570 Y | 8/2005 |
|---|---|---|
| CN | 201089755 Y | 7/2008 |
| CN | 102235499 A | 11/2011 |
| CN | 202834047 U | 3/2013 |
| CN | 204510281 U | 7/2015 |
| CN | 206245346 U | 6/2017 |
| GB | 203369 A | 9/1923 |
| JP | 2003103108 A | 4/2003 |
| JP | 4409824 B2 | 2/2010 |
| WO | 2017089464 A1 | 6/2017 |

OTHER PUBLICATIONS

International Search Report and Written Opinion dated Oct. 15, 2018 (Oct. 15, 2018) for Corresponding PCT/EP2018/069381.

*Primary Examiner* — Huy Tram Nguyen

(57) ABSTRACT

A manhole for a polymerization unit having a through-hole formed with a shoulder matching a corresponding shoulder of a plug of a closure member operatively inserted in the through-hole. The through-hole can be closed with a minimum clearance, such that polymer particles do not deposit in the gap between the wall of the unit and the plug of the closure member.

13 Claims, 4 Drawing Sheets

US 11,084,016 B2

POLYMERIZATION UNIT WITH IMPROVED MANHOLE

FIELD OF THE INVENTION

In general, the present disclosure relates to the field of chemistry. More specifically, the present disclosure relates to polymer chemistry. In particular, the present disclosure relates to a polymerization unit including a manhole.

BACKGROUND OF THE INVENTION

The gas-phase polymerization of olefins is carried out in polymerization plants including several units. In some instances, the unit include reactors, cyclones, filters, and tanks. In some instances, the olefins are selected from the group consisting of ethylene, propylene, butene and higher olefins. In some instances, inspection or maintenance of such units is carried out by accessing the inside of the unit through manholes.

In some instances, a manhole includes a hollow body mounted on an opening in the wall of polymerization unit, closed by a closure member. The closure member includes a plug having a conical shape, with the tapered part directed toward the inside of the polymerization unit, such as toward the reactor. The conical shape provides an easy removal of the closure member from the opening. In some instances and in some polymerization units, reactive polymer particles, including fine particles, may fill the circumferential gap between the opening in the wall of the reactor and the conical part of the plug. These particles may seal the closure member to the reactor wall, rendering opening of the manhole difficult and time-consuming. In some instances, chunks of polymer particles detach from the wall and drop into the reactor. In some instances, the chunks block the discharge lines of the reactor.

SUMMARY OF THE INVENTION

As used herein, the term "manhole" refers to a cylindrical body closed by a cover and mounted on an opening in the wall of a polymerization unit.

As used herein, the terms "units of a polymerization plant" or "polymerization unit" are used interchangeably and refer to any apparatus or device that contains the polymer, being formed or is already formed as a result of the polymerization reaction, both in a resting state or in a transfer state. In some instances, a polymerization unit includes reactors, transfer lines, filters, and tanks, without being limited to these components. For the sake of simplicity, reference is made to a reactor. However, as used herein, any other unit wherein a polymer is formed, or flows in the gas-phase, is encompassed by the terms "units of a polymerization plant" or "polymerization unit".

In some embodiments, the present disclosure provides for a polymerization unit including a manhole mounted on an opening in a wall of the polymerization unit, the manhole including a hollow body mounted in the opening, projecting from the wall of the polymerization unit, and including a cylindrical hole aligned with the opening of the polymerization unit, and a closure member provided with a cover plate, wherein:

the cylindrical hole of the hollow body includes a first hole portion and a second hole portion, wherein the second hole portion in communication with the inside of the polymerization unit, the first hole portion having a diameter (Dh), the second hole portion having a diameter (dh), and the diameter (Dh) of the first hole portion being larger than the diameter (dh) of the second hole portion, thereby forming a shoulder between the first and second hole portions of the hollow body; and the closure member includes a cylindrical plug operatively inserted in the cylindrical hole of the hollow body and including a first plug portion having a diameter (Dp) and a second plug portion having a diameter (dp), wherein the diameter (Dp) of the first plug portion being larger than diameter (dp) of the second plug portion, the first and second plug portions forming a shoulder operatively abutting against the shoulder formed in the hollow body, and the second plug portion having an end wall matching the shape of the inner wall of the polymerization unit, thereby the wall of the polymerization unit is continuous when the closure member is inserted in the flange.

In some embodiments, the first plug portion is inserted in the first hole portion with a first clearance, the second plug portion is inserted in the second hole portion with a second clearance, and the first clearance being larger than the second clearance.

In some embodiments, the first hole portion has a length ($L_h$), the first plug portion has a length (Lp), the second hole portion has a length ($l_h$), the second plug portion has a length ($l_p$), and the length ($L_h$) and the length (Lp) being longer than the length ($l_h$) of the second hole portion and the length ($l_p$) of the second plug portion, respectively.

In some embodiments, the cylindrical hole including the first hole portion and the second hole portion is formed directly in the hollow body.

In some embodiments, the cylindrical hole including the first hole portion and the second hole portion is formed in a sleeve mounted in the hollow body.

DETAILED DESCRIPTION OF THE INVENTION

Figure 1:
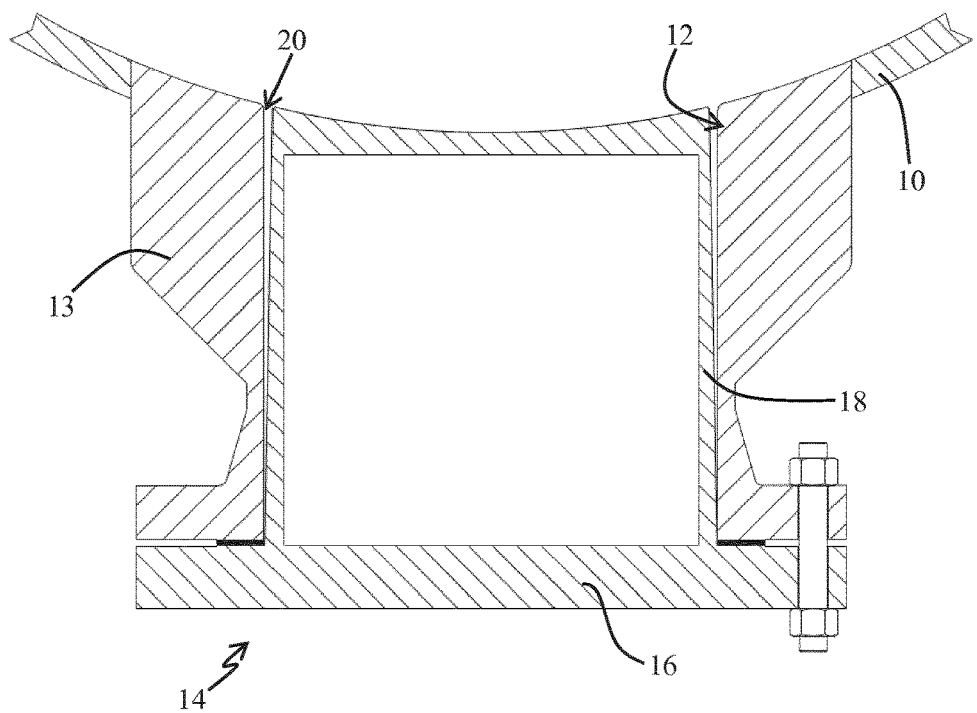
FIG. 1 is a schematic representation of a manhole in a unit of a polymerization plant.

FIG. 1 shows a manhole in a unit of a polymerization plant. The reactor wall 10 is provided with an opening through which operators can access the inside of the reactor to carry out inspection and maintenance activities. A hollow body 13 is mounted on the opening of the reactor wall 10 and projects from the reactor wall 10. Hollow body 13 is provided with a cylindrical hole 12 for communication with the inside of the reactor.

Hole 12 is closed by closure member 14 consisting of a cover plate 16 and a conical plug 18 inserted in the cylindrical hole 12. The conical plug has the tapered part directed toward the inside of the reactor, thereby allowing for removal of the closure member. This structure forms circumferential gap 20 between the opening in the wall of the reactor and the end portion of the closure member, therein polymer particles can deposit and block the closure member.

Figure 2:
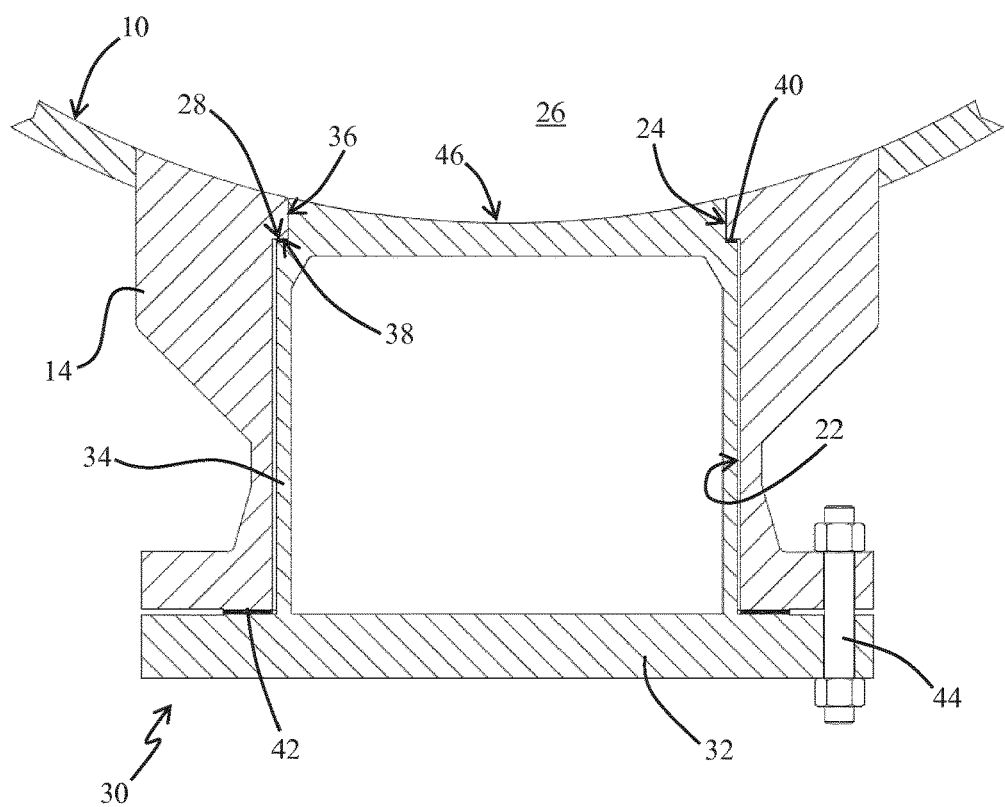
FIG. 2 is a view of a longitudinal section of a manhole according to a first embodiment of the manhole disclosed herein.
Figure 2B:
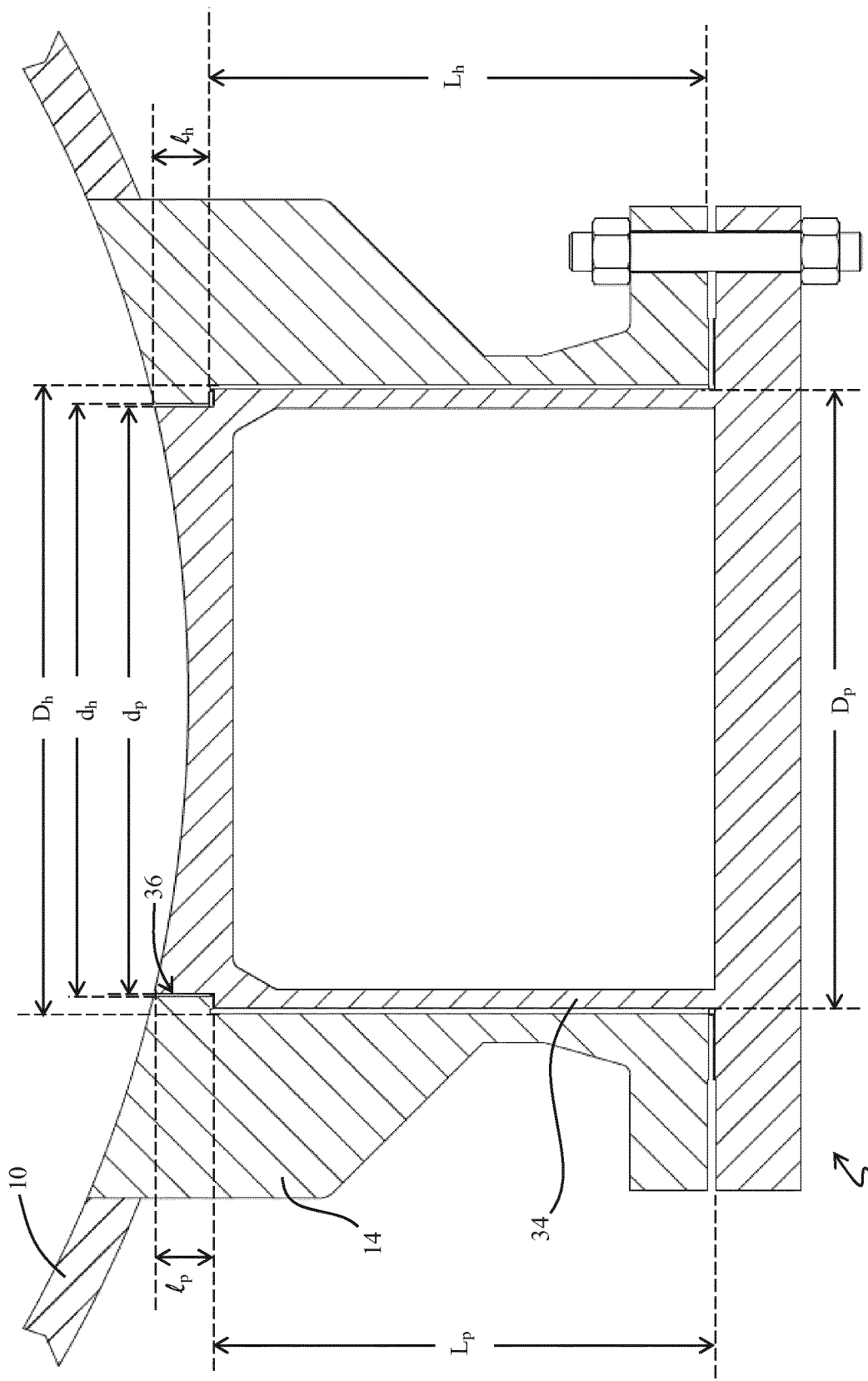
FIG. 2B is an additional view of a longitudinal section of the FIG. 2 manhole, showing dimensions of parts.
Figure 3:
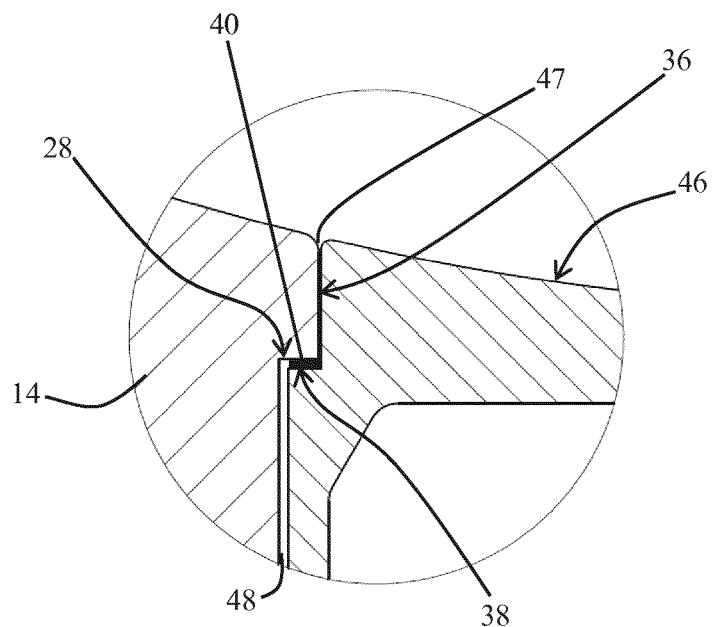
FIG. 3 is an enlarged view of a part of the manhole of FIG. 2.

FIGS. 2, 2B and 3 show certain embodiments of a manhole according to the disclosure.

A polymerization unit such as a reactor has a wall 10 provided with an opening, thereby allowing inspection and maintenance activities. A hollow body 14 is mounted on the opening of wall 10. The hollow body 14 has a cylindrical through-hole including a first hole portion 22 and a second hole portion 24, the second hole portion 24 being in communication/contact with the inside of the polymerization unit. The first hole portion 22 has a length ($L_h$) and a diameter ($D_h$) with both being larger than the length ($l_h$) and diameter ($d_h$) of the second hole portion 24, namely $L_h > l_h$ and $D_h > d_h$. Therefore, a shoulder 28 is formed between the first hole portion 22 and the second hole portion 24 of the hollow body 14.

In some embodiments, a closure member 30 is inserted in the through-hole of hollow body 14 to seal the inside 26 of the reactor. The closure member 30 includes a cover plate 32 and a plug formed with a first plug portion 34 and a second plug portion 36. The first plug portion 34 has a length ($L_p$) and a diameter ($D_p$), respectively, larger than the length ($l_p$) and diameter ($d_p$) of the second plug portion 36. Therefore, a shoulder 38 is formed between the first 22 and second 24 plug portions of closure member 30. The length ($L_h$) and a diameter ($D_h$) of the first and second hole portions 22, 24 correspond to the length ($L_p$) and a diameter ($D_p$) of the first plug portion 34 and the second plug portion 36, the second plug portion 36 being slightly smaller to allow sliding into the first plug portion 34 with clearance. When the plug of the closure member 30 is pushed into the hole of hollow body 14, shoulder 38 abuts shoulder 28 of the through-hole of the hollow body. In this position, the cover plate 32 of the closure member 30 abuts the top part of hollow body 14, such that the manhole is closed.

A ring gasket 40 is housed on shoulder 28 or on shoulder 38, to ensure sealing. A ring gasket 42 is also housed between cover plate 32 and hollow body 14, to ensure sealing. Ring gasket 40 and ring gasket 42 are any type of ring gasket for polymer production use. Fastening means 44 removably fasten the closure member 30 to hollow body 14. In some embodiments, the fastening means 44 is selected from the group consisting of nuts and bolts.

The second portion 36 of the plug has an end wall 46 facing the inside of the reactor. The end wall 46 matches the shape of the inner wall of the reactor, such that a uniform and continuous surface is formed within the reactor when the opening is closed by the manhole. In some embodiments, the reactor has a cylindrical wall and the end wall 46 of the closure member has a curved shape matching the cylindrical shape of the reactor wall.

With reference to FIG. 3, the first clearance 48, namely the radial gap between the first plug portion 34 and the first hole portion 22, is larger than the second clearance 47, namely the radial gap between the second plug portion 36 and the second hole portion 24, thereby allowing smooth insertion and removal of the closure member 30 in the through-hole of hollow body 14. It is believed that a precise alignment of the plug into the hole permits sliding the second plug portion 36 into the second hole portion 24, where the second clearance 47 is small. In some embodiments, the second clearance is 1 mm or less, alternatively about 0.5 mm. In some embodiments, the first clearance 48, between the first plug portion 34 and the first hole portion 22, is larger than 1 mm, alternatively about 2 mm. It is believed that the second clearance 47 prevents polymer particles from entering the gap between closure member 30 and hole of the flange, thereby sealing the hole.

In some embodiments, the length $L_h$ of the first portion 22 of the through-hole of the hollow body is at least twice the length $l_h$ of the second portion 24 of the hole, namely $L_h > 2 \cdot l_h$.

Figure 4:
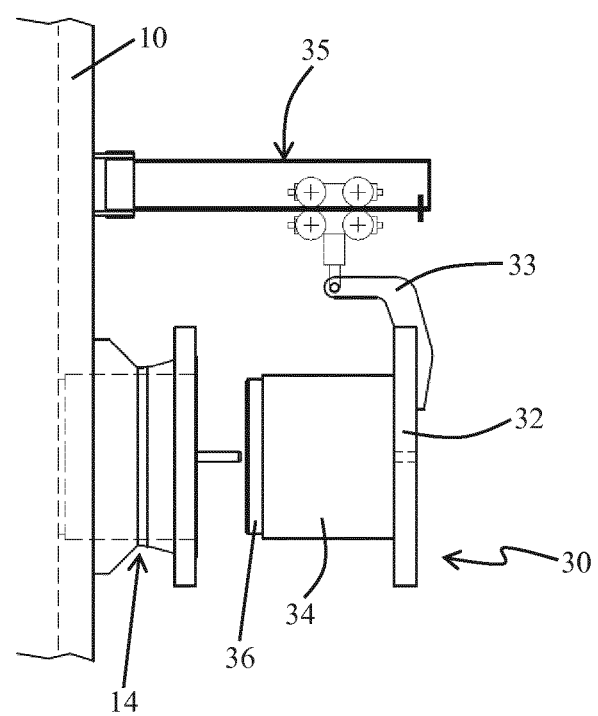
FIG. 4 is a schematic view of the manhole of FIG. 2 in the open position.

FIG. 4 shows a lifting system of the manhole including lifting lugs 33 hinged to a mounting bracket 35.

In some embodiments, the through-hole of the hollow body is directly formed with a shoulder 28. In some embodiments, the hollow body is not formed with a through-hole having a shoulder 28 and the manhole is adapted to the hollow body.

Figure 5:
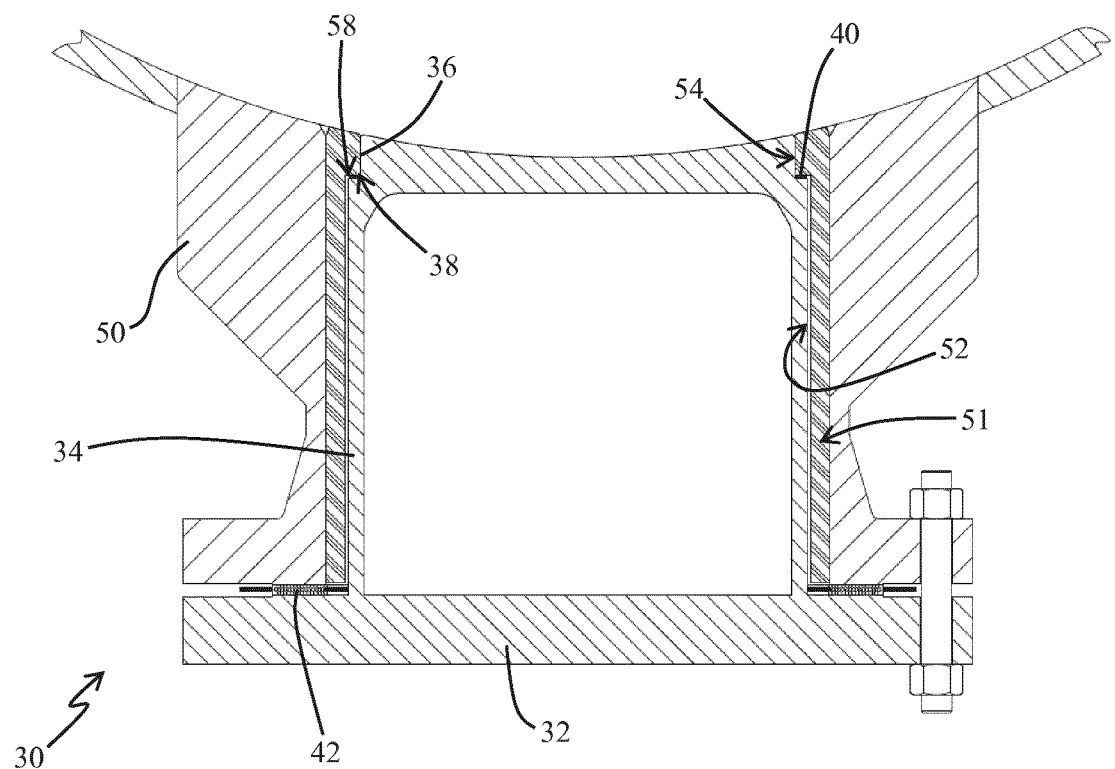
FIG. 5 is a view of a longitudinal section of a manhole according to a second embodiment of the manhole disclosed herein.
Figure 6:
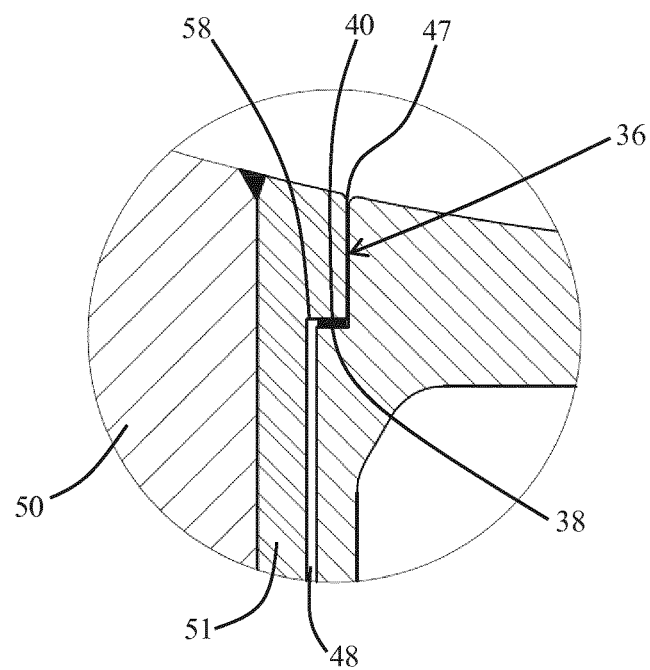
FIG. 6 is an enlarged view of a part of the manhole of FIG. 5.

With reference to FIG. 5 and FIG. 6, a hollow body 50 has a through-hole with a straight wall, namely, there is no shoulder. The hollow body is provided with a sleeve 51 fitting exactly into the through hole of the flange, without any clearance. In some embodiments, sleeve 51 is welded to the manhole.

Sleeve 51 has a cylindrical through-hole including a first hole portion 52 and a second hole portion 54, wherein the second hole portion 54 is in communication/contact with the inside of the polymerization unit. The first hole portion 52 has a length ($L_h$) and a diameter ($D_h$) larger than the length ($l_h$) and diameter ($d_h$) of the second hole portion 54, namely $L_h > l_h$ and $D_h > d_h$. As a result of this structure, a shoulder 58 is formed between the first hole portion 52 and the second hole portion 54 of sleeve 51. Sleeve 51 provides a through-hole with the same feature as described in connection with FIG. 2 and FIG. 3. In some embodiments, the same closure member is used to close the opening of the reactor. The reference numbers for FIG. 2 and FIG. 3 are used here for the following description of closure member 30.

The closure member 30 includes a cover plate 32 and a plug formed with a first plug portion 34 and a second plug portion 36. The first plug portion 34 has a length ($L_p$) and a diameter ($D_p$), respectively, larger than the length ($l_p$) and diameter ($d_p$) of the second plug portion 36. A shoulder 38 is formed between the first plug portion 34 and the second plug portion 36 of the closure member 30. The length and diameter of the first hole portion 52 and the second hole portion 54 correspond to the length and diameter of the first plug portion 34 and the second plug portion 36, the plug portion being slightly smaller to allow sliding into the hole portion with clearance. When the plug of the closure member 30 is pushed into the hole of sleeve 51, shoulder 38 abuts shoulder 28 of the through-hole of the sleeve. In this position, the cover plate 32 of the closure member 30 abuts the top part of hollow body 50 and sleeve 51, such that the opening of the reactor is closed. A ring gasket 40 is placed between shoulders 38 and 58, and a ring gasket 42 is placed between cover plate 32 and hollow body 50 with sleeve 51, to ensure sealing.

The second portion 36 of the plug has an end wall 46 facing the inside of the reactor. The end wall 46 matches the shape of the inner wall of the reactor, such that a uniform and continuous surface is formed within the reactor when the opening is closed by the closure member 30.

With reference to FIG. 6, the first clearance 48, between the first plug portion 34 and the first hole portion 52, is larger than the second clearance 47, between the second plug portion 36 and the second hole portion 54, thereby allowing smooth insertion and removal of the closure member 30 in the through-hole of sleeve 51. It is believed that a more precise alignment of the plug into the hole permits sliding the second plug portion 36 into the second hole portion 54, where the second clearance is small. In some embodiments, the second clearance is 1 mm or less, alternatively about 0.5 mm. In some embodiments, the first clearance is larger than 1 mm, alternatively about 2 mm. The second clearance 47 prevents polymer particles from entering the gap between closure member 30 and the hole of the sleeve, thereby sealing the hole.

In some embodiments, the length $L_h$ of the first portion 52 of the through-hole of the sleeve is at least twice the length $l_h$ of the second portion 54 of the hole, namely $L_h > 2 \cdot l_h$.

What is claimed is:

1. A polymerization unit comprising:
    a manhole mounted on an opening in a wall of the polymerization unit, the manhole comprising
        a hollow body mounted in the opening, projecting from the wall of the polymerization unit, and comprising
            a cylindrical hole aligned with the opening of the polymerization unit, and
        a closure member provided with a cover plate,
    wherein:
        the cylindrical hole of the hollow body comprises
            a first hole portion and
            a second hole portion,
                wherein the second hole portion is in communication with the inside of the polymerization unit, the first hole portion having a diameter ($D_h$), the second hole portion having a diameter ($d_h$), and the diameter ($D_h$) of the first hole portion being larger than the diameter ($d_h$) of the second hole portion, thereby forming a shoulder between the first and second hole portions of the hollow body; and
        the closure member comprises
            a cylindrical plug operatively inserted in the cylindrical hole of the hollow body and comprising
                a first plug portion having a diameter ($D_p$) and
                a second plug portion having a diameter ($d_p$),
            wherein the diameter ($D_p$) of the first plug portion being larger than diameter ($d_p$) of the second plug portion, the first and second plug portions forming a shoulder operatively abutting against the shoulder formed in the hollow body, and the second plug portion having an end wall matching the shape of the inner wall of the polymerization unit, thereby the wall of the polymerization unit is continuous when the closure member is inserted in the flange.

2. The polymerization unit of claim 1, wherein:
    the diameter ($D_p$) of the first plug portion of the closure member is smaller than the diameter ($D_h$) of the first hole portion of the hollow body, thereby originating a first clearance between the first plug portion and the first hole portion,
    the diameter ($d_p$) of the second plug portion of the closure member is smaller than the diameter ($d_h$) of the second hole portion of the hollow body, thereby originating a second clearance between the second plug portion and the second hole portion, and
    the first clearance is larger than the second clearance.

3. The polymerization unit of claim 1, wherein the first clearance is larger than 1 mm.

4. The polymerization unit of claim 1, wherein the second clearance is 1 mm or less.

5. The polymerization unit of claim 1, wherein the first hole portion has a length (Lh) longer than the length (lh) of the second hole portion and the first plug portion has length (Lp) longer than the length (lp) of the second plug portion.

6. The polymerization unit of claim 1, wherein the first hole portion is at least twice the length (lh) of the second hole portion.

7. The polymerization unit of claim 1, wherein the hollow body further comprises
    a sleeve provided with the cylindrical hole and comprising
        a first hole portion and
        a second hole portion,
            wherein the second hole portion is in communication with the inside of the polymerization unit and the first hole portion having a diameter ($D_h$) larger than the diameter ($d_h$) of the second hole portion, thereby forming a shoulder between the first hole portion and the second hole portion.

8. The polymerization of claim 7, wherein:
    the diameter ($D_p$) of the first plug portion of the closure member is smaller than the diameter ($D_h$) of the first hole portion of the sleeve of the hollow body, thereby originating a first clearance between the first plug portion and the first hole portion,
    the diameter ($d_p$) of the second plug portion of the closure member is smaller than the diameter ($d_h$) of the second hole portion of the sleeve of the hollow body, whereby thereby originating a second clearance between the second plug portion and the second hole portion, and
    the first clearance is larger than the second clearance.

9. The polymerization unit of claim 8, wherein the first clearance is larger than 1 mm.

10. The polymerization unit of claim 8, wherein the second clearance is 1 mm or less.

11. The polymerization unit of claim 7, wherein the first hole portion has a length ($L_h$) larger longer than the length ($l_h$) of the second hole portion and the first plug portion has length (Lp) longer than the length ($l_p$) of the second plug portion.

12. The polymerization unit of claim 11, wherein the length (Lh) of the first hole portion is at least twice the length ($l_h$) of the second hole portion.

13. The polymerization unit of claim 1, further comprising
    a ring gasket housed between the shoulder of the plug and the shoulder of the hollow body.

* * * * *

UNITED STATES PATENT AND TRADEMARK OFFICE
CERTIFICATE OF CORRECTION

| | |
|---|---|
| PATENT NO. | : 11,084,016 B2 |
| APPLICATION NO. | : 16/636774 |
| DATED | : August 10, 2021 |
| INVENTOR(S) | : Bonaccorsi et al. |

It is certified that error appears in the above-identified patent and that said Letters Patent is hereby corrected as shown below:

On the Title Page

Column 1, Item (30), Line 1, delete "17185700" and insert -- 17185700.6 --, therefor In the Specification In Column 1, Line 3, after "POLYMERIZATION UNIT WITH IMPROVED MANHOLE" insert -- This application is the U.S. National Phase of PCT International Application PCT/EP2018/069381, filed July 17, 2018, claiming benefit of priority to European Patent Application No. 17185700.6, filed August 10, 2017, the contents of which are incorporated herein by reference in its entirety. --

In the Claims

In Column 6, Claim 8, Line 37, after "body," delete "whereby"

In Column 6, Claim 11, Line 46, after "($L_h$)" delete "larger"

Signed and Sealed this
Seventeenth Day of January, 2023

Katherine Kelly Vidal
*Director of the United States Patent and Trademark Office*